United States Patent
Eade et al.

(10) Patent No.: US 10,379,606 B2
(45) Date of Patent: Aug. 13, 2019

(54) HOLOGRAM ANCHOR PRIORITIZATION

(71) Applicant: Microsoft Technology Licensing, LLC, Redmond, WA (US)

(72) Inventors: Ethan Eade, Pittsburgh, PA (US); Jeroen Vanturennout, Snohomish, WA (US); Neena Kamath, Seattle, WA (US); Alex Christopher Turner, Bellevue, WA (US); David Fields, Kirkland, WA (US); Jonathan David Hildebrandt, Seattle, WA (US); Michael Grabner, Seattle, WA (US); Gavin Dean Lazarow, Redmond, WA (US); Tushar Cyril Bhatnagar, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/614,408

(22) Filed: Jun. 5, 2017

(65) Prior Publication Data
US 2018/0286128 A1    Oct. 4, 2018

Related U.S. Application Data

(60) Provisional application No. 62/479,198, filed on Mar. 30, 2017.

(51) Int. Cl.
*G06T 19/00* (2011.01)
*G06F 3/01* (2006.01)
(Continued)

(52) U.S. Cl.
CPC .......... *G06F 3/012* (2013.01); *G02B 27/017* (2013.01); *G02B 27/0172* (2013.01); *G03H 1/08* (2013.01);
(Continued)

(58) Field of Classification Search
None
See application file for complete search history.

(56) References Cited

U.S. PATENT DOCUMENTS 6,141,015 A * 10/2000 Tanaka .................. G06T 19/20
                                                345/424
7,557,971 B1    7/2009 Sigel et al.
(Continued)

FOREIGN PATENT DOCUMENTS

WO    2013083650 A1    6/2013

OTHER PUBLICATIONS

Parkinson, David, "A Review of Mobile Augmented Reality", http://www.fireplant.co.uk/assets/pdf/ar.pdf, Retrieved on: Mar. 14, 2017, 5 pages.
(Continued)

*Primary Examiner* — Xiao M Wu
*Assistant Examiner* — Steven Z Elbinger
(74) *Attorney, Agent, or Firm* — Alleman Hall Creasman & Tuttle LLP

(57) ABSTRACT

A computing device is provided, including a display configured to display a plurality of holograms superimposed upon a physical environment. The computing device may further comprise a processor configured to store in non-volatile memory a representation of the physical environment, including a plurality of hologram anchors indicating locations at which the holograms are displayed. The processor may store a priority level of each hologram anchor, wherein each priority level is selected from a plurality of priority levels including a high priority level and a low priority level, and wherein at least one hologram anchor has the low priority level. The processor may determine that a total size of the plurality of hologram anchors exceeds a predetermined size threshold. The processor may, for at least
(Continued)

one hologram anchor assigned the low priority level, delete that hologram anchor from the representation of the physical environment.

20 Claims, 15 Drawing Sheets

(51) Int. Cl.
  *G03H 1/08* (2006.01)
  *G02B 27/01* (2006.01)
  *G05D 1/02* (2006.01)
  *G06F 3/03* (2006.01)

(52) U.S. Cl.
  CPC ......... *G03H 1/0808* (2013.01); *G05D 1/0274* (2013.01); *G06F 3/011* (2013.01); *G06F 3/0304* (2013.01); *G06T 19/006* (2013.01); *G02B 2027/014* (2013.01); *G02B 2027/0174* (2013.01); *G02B 2027/0187* (2013.01)

(56) References Cited

U.S. PATENT DOCUMENTS

| | | | |
|---|---|---|---|
| 8,115,768 B2 | 2/2012 | Sroka et al. | |
| 9,020,187 B2 | 4/2015 | Pirchheim et al. | |
| 9,286,711 B2 | 3/2016 | Geisner et al. | |
| 9,691,128 B2* | 6/2017 | Watson | G06T 3/40 |
| 9,952,053 B2* | 4/2018 | Fong | G01C 21/32 |
| 2003/0182072 A1* | 9/2003 | Satoh | G06T 7/80 |
| | | | 702/95 |
| 2005/0052714 A1 | 3/2005 | Klug et al. | |
| 2013/0326364 A1 | 12/2013 | Latta et al. | |
| 2013/0335301 A1* | 12/2013 | Wong | G02B 27/0093 |
| | | | 345/8 |
| 2014/0049559 A1 | 2/2014 | Fleck et al. | |
| 2014/0184641 A1* | 7/2014 | Naganawa | G09G 5/377 |
| | | | 345/629 |
| 2014/0204119 A1* | 7/2014 | Malamud | G06T 19/006 |
| | | | 345/633 |
| 2014/0267234 A1 | 9/2014 | Hook et al. | |
| 2014/0267420 A1* | 9/2014 | Schowengerdt | G06F 3/012 |
| | | | 345/633 |
| 2014/0375683 A1* | 12/2014 | Salter | G06F 3/013 |
| | | | 345/633 |
| 2015/0070274 A1 | 3/2015 | Morozov | |
| 2015/0302623 A1* | 10/2015 | Ishikawa | G06K 9/2063 |
| | | | 345/629 |
| 2016/0025981 A1 | 1/2016 | Burns et al. | |
| 2016/0049008 A1* | 2/2016 | Haddick | G02B 27/0172 |
| | | | 345/633 |
| 2016/0210784 A1 | 7/2016 | Ramsby et al. | |
| 2016/0350964 A1* | 12/2016 | Zhu | G06T 17/05 |
| 2016/0371884 A1 | 12/2016 | Benko et al. | |
| 2016/0379409 A1 | 12/2016 | Gavriliuc et al. | |
| 2017/0186203 A1* | 6/2017 | Fournier | G08G 5/0013 |

OTHER PUBLICATIONS

Schwald, B. et al., "Composing 6 DOF Tracking Systems for VR/AR", In Proceedings of the Computer Graphics International (CGI'04), Jun. 16, 2004, Washington, DC, USA, 8 pages.

Carbotte, K., "Inside-Out Position Tracking Software for VR, AR Device OEMs: Eonite Announces Vantage Head Tracker", Tom's Hardware Website, Available Online at http://www.tomshardware.com/news/eonite-vantage-inside-out-tracking,33404.html, Jan. 12, 2017, 7 pages.

Alzarok, H. et al., "3D Visual Tracking of an Articulated Robot in Precision Automated Tasks", Journal of Sensors, vol. 17, Jan. 7, 2017, 30 pages.

"AR/VR Positional Tracking" Structure Website, Available Online at https://structure.io/use/vr-positional-tracking, Available as Early as Sep. 30, 2016, 6 pages.

* cited by examiner

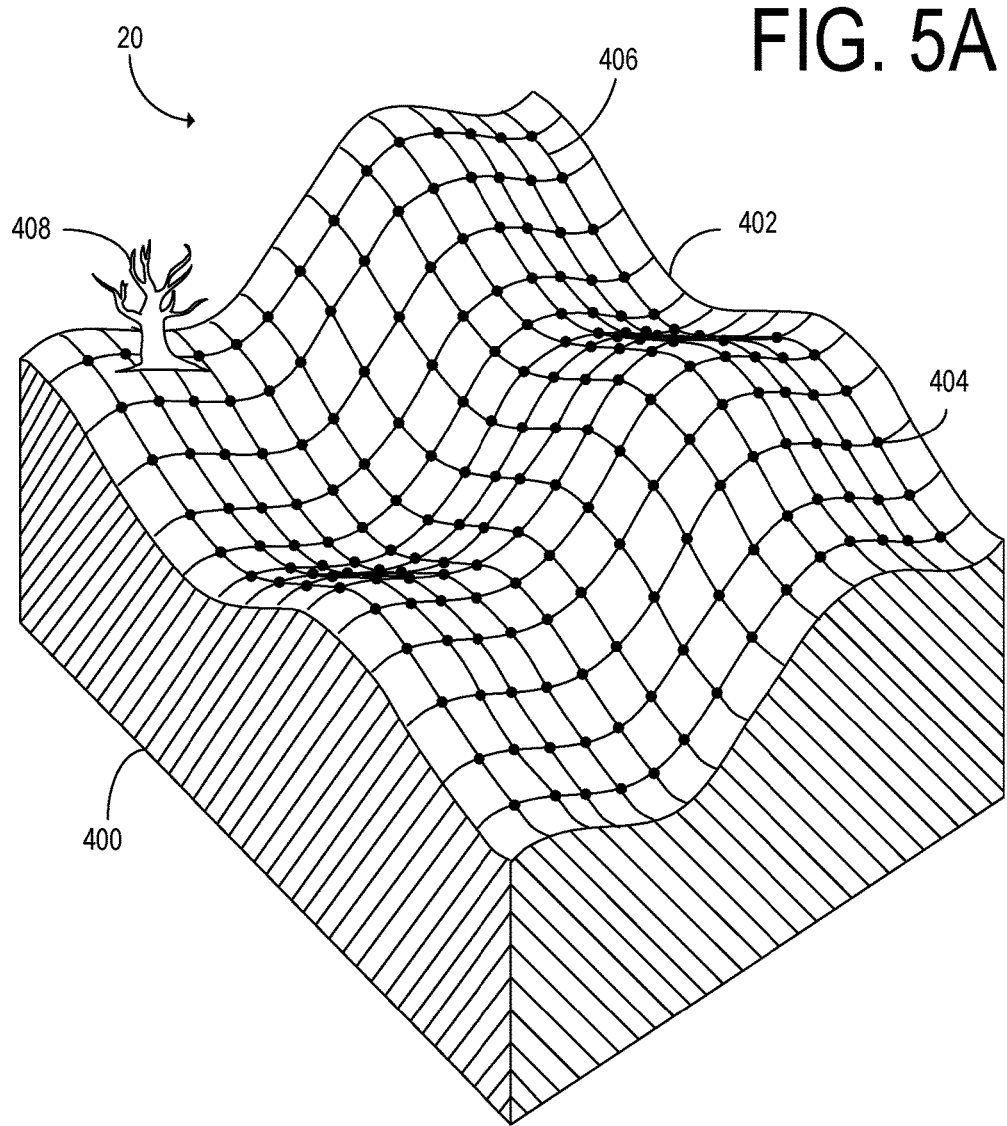

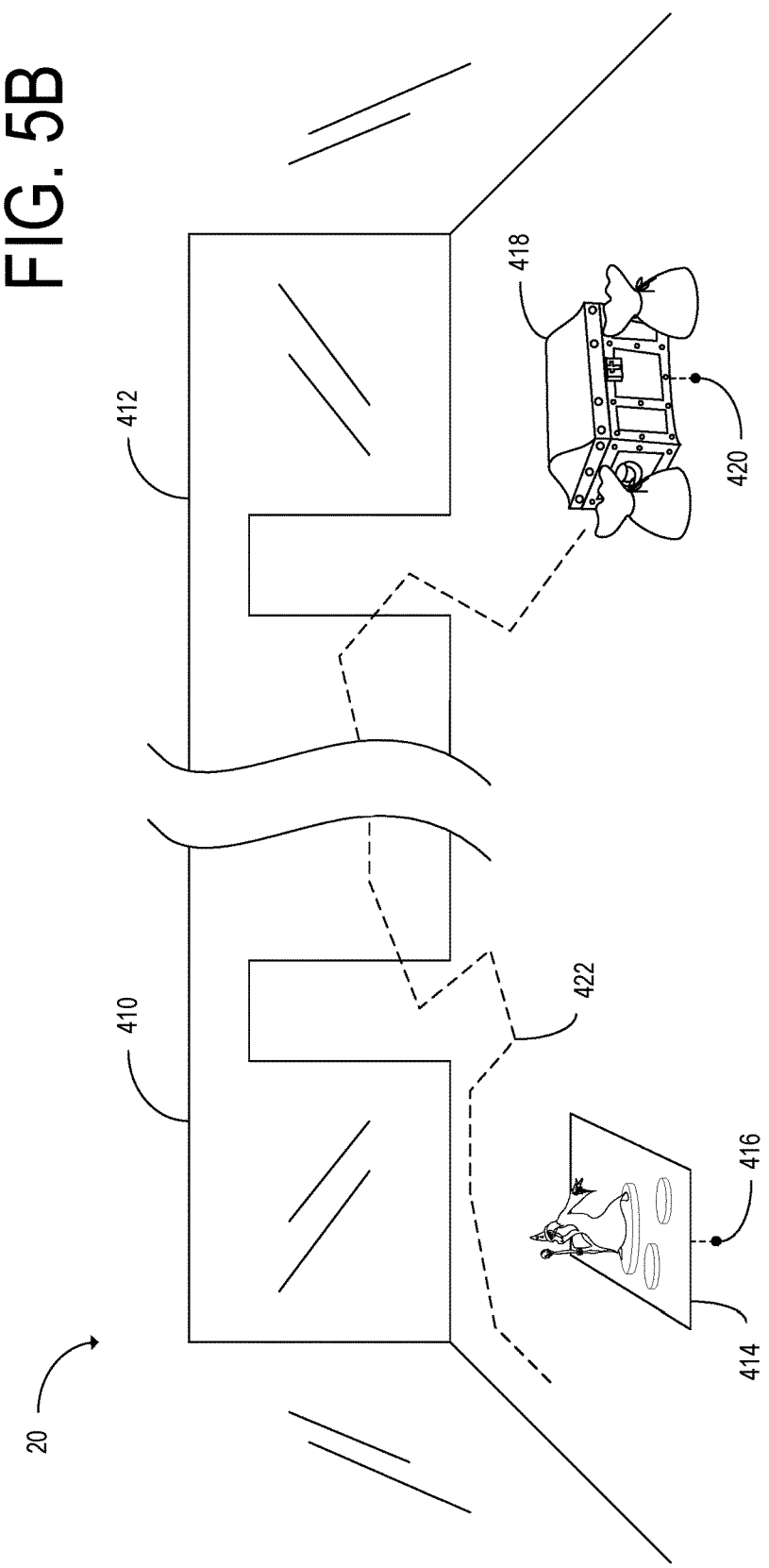

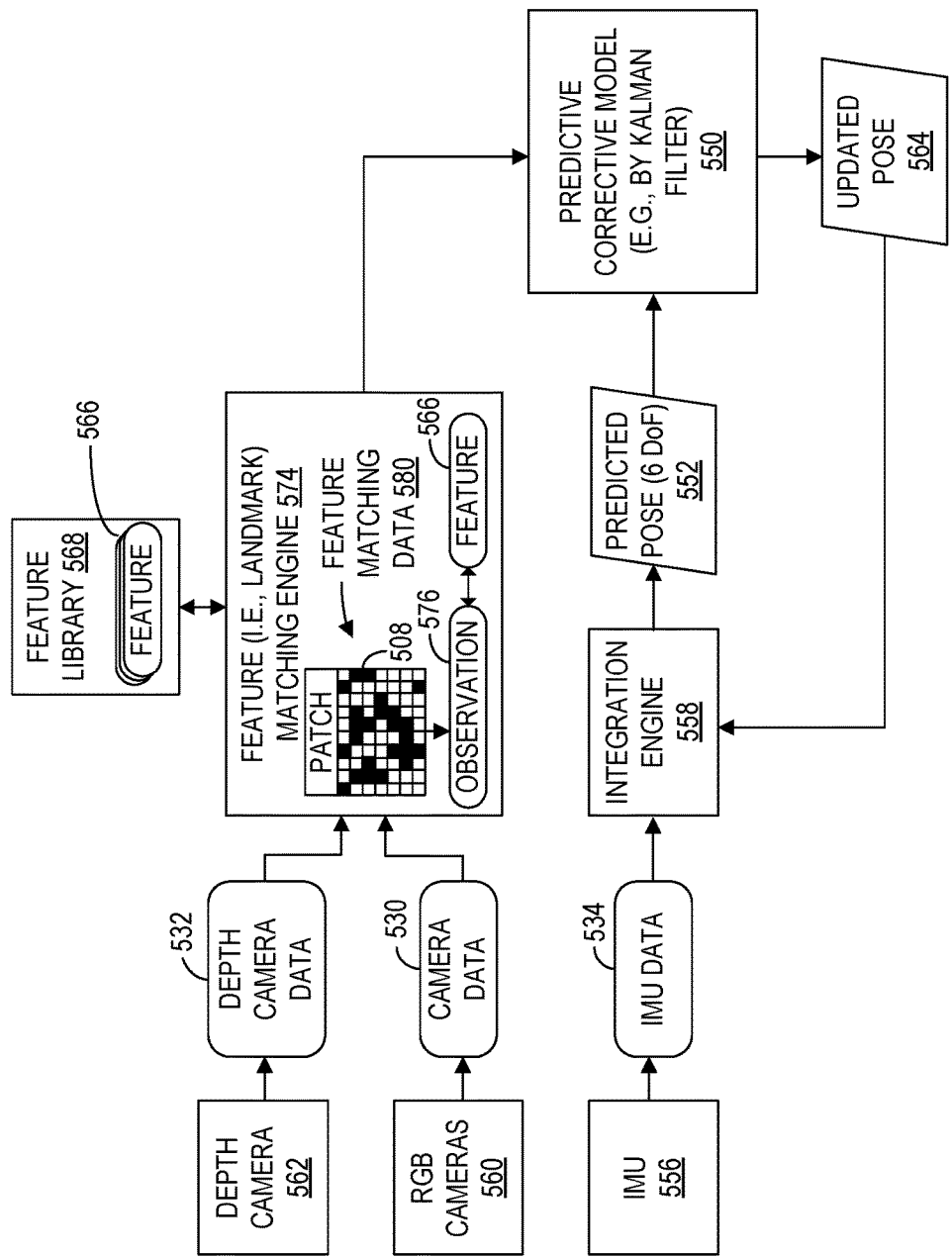

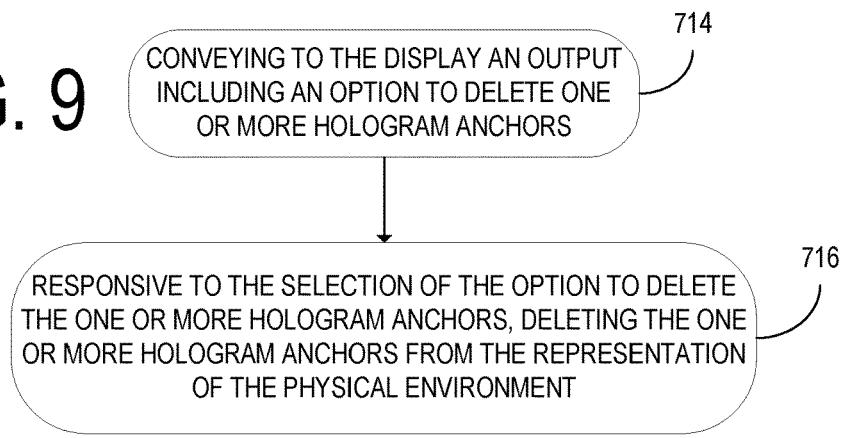
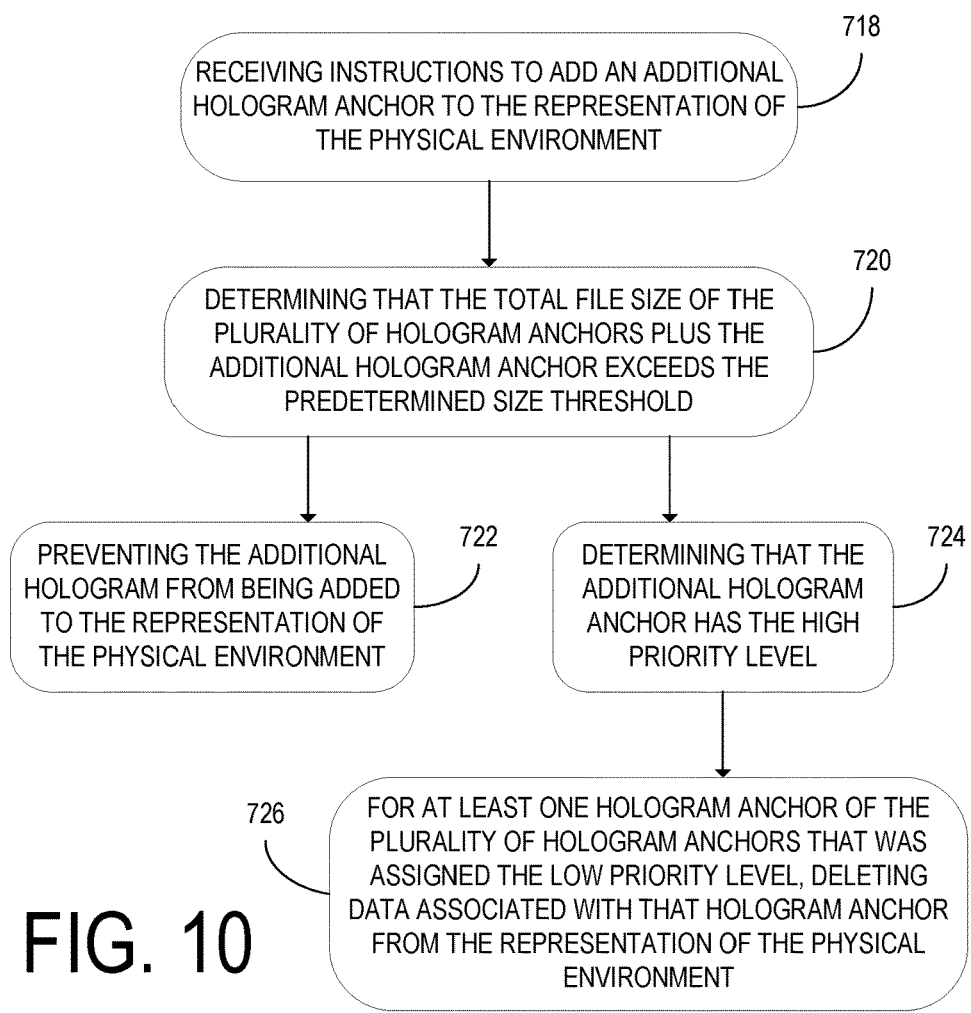

HOLOGRAM ANCHOR PRIORITIZATION

CROSS REFERENCE TO RELATED APPLICATIONS

This application claims priority to U.S. Provisional Patent Application No. 62/479,198 filed Mar. 30, 2017, the entirety of which is hereby incorporated herein by reference.

BACKGROUND

Six-degree-of-freedom (6DoF) tracking, also known as visual tracking, is a method by which a device (for example, a mixed-reality device, robot, or mobile phone) uses sensors (for example, one or more camera and/or inertial motion unit) to determine its position relative to its surrounding physical environment. For example, a mixed-reality device may use 6DoF tracking to place holograms or digital content in the physical world, and a robot may use 6DoF tracking to navigate itself relative to its surroundings. Of increasing value is the ability a device to operate with a durable and dynamic model of its position relative to the physical environment.

Inside-out tracking is a method by which a device can determine its position without the help of external sensors in the environment. It is often useful for a device that uses inside-out tracking to persist its spatial tracking data over time. However, battery capacity and data storage space of the inside-out tracking device may be limited by physical constraints of the device. When an inside-out tracking device has limited data storage and/or battery life, there is a challenge in storing sufficient information to provide a high-quality user experience.

SUMMARY

To address the above issue, a computing device is provided, including a display configured to display a plurality of holograms superimposed upon a physical environment. The computing device may further comprise a processor configured to store in non-volatile memory a representation of the physical environment, including a plurality of hologram anchors indicating locations in the physical environment relative to which the holograms are displayed. The processor may be further configured to store a priority level of each hologram anchor, wherein each priority level is selected from a plurality of priority levels including at least a high priority level and a low priority level, and wherein at least one hologram anchor of the plurality of hologram anchors has the low priority level. The processor may be further configured to determine that a total size of the plurality of hologram anchors exceeds a predetermined size threshold. The processor may be further configured to, for at least one hologram anchor of the plurality of hologram anchors that was assigned the low priority level, delete that hologram anchor from the representation of the physical environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A shows a schematic representation of an example physical environment including a surface of an object.

FIG. 5B shows a schematic representation of an example physical environment including a first room and a second room.

FIG. 6C illustrates a general overview of one possible SLAM algorithm for simultaneous location and mapping by computing device of FIG. 1.

FIG. 9 is a flowchart showing additional steps that may be performed as part of the method of FIG. 8.

FIG. 10 is a flowchart showing additional steps that may be performed as part of the method of FIG. 8.

DETAILED DESCRIPTION

The inventors have identified shortcomings of existing methods for persisting spatial data for inside-out tracking devices. A first existing method is to use identified posters or markers as points of reference in the physical environment, so that each device re-establishes its position in relation to these, and does not need to store significant information about the physical environment itself. This poster method may require the physical environment to be changed with the addition of posters, adding cost and setup time, and if posters are moved or changed, the positions measured by the devices may move with respect to the posters, reducing reliability. This method may also limit the physical scope of persistence, as the devices may need to be within operating range of the posters in the physical environment.

A second existing method is for devices to persist an entire map of their surroundings. As the operating area of a device expands, the size and/or resolution of the map may be limited by the storage limitations of the device. Saving and loading maps from external sources may result in slow loading times when large amounts of data are transferred.

A third existing method for persisting spatial data for inside-out tracking devices is to establish a finite operating area, using physical or virtual boundaries. This boundary method may require end-user setup and maintenance, which may affect the fluidity of the user experience. The boundary method artificially segments the physical world, and may limit the area of usage of the device, which may be challenging for mobile devices.

Figure 1:
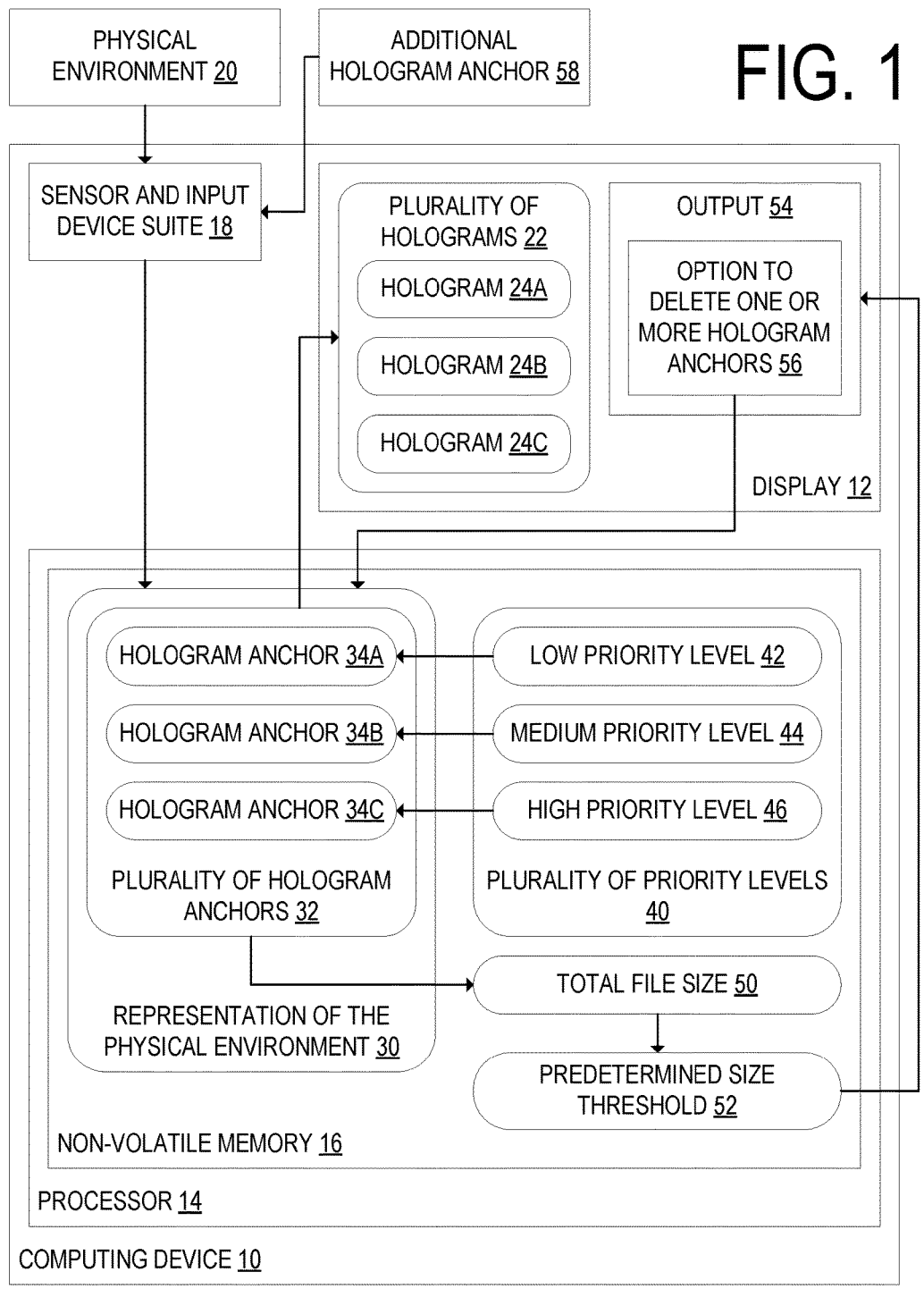
FIG. 1 shows a schematic representation of an example computing device, according to one embodiment of the present disclosure.

In view of the deficiencies of existing methods of persisting spatial data for inside-out tracking devices, as described above, the inventors have conceived of the following approach. FIG. 1 shows a schematic representation of a computing device 10 according to one embodiment of the present disclosure. The computing device 10 includes a display 12 configured to display a plurality of holograms 22 superimposed upon a physical environment 20. "Hologram" is defined herein as an image of a virtual object overlaid onto the physical environment 20. The image may be overlaid on the physical environment 20 by being displayed on the display 12 in a position that matches a target position in the physical environment 20. As discussed below, the display 12 may be a stereo display that is at least partially see-through, and the hologram may be positioned to appear at a desired depth and position within the user's field of view. Alternatively, the display 12 may be a display of a portable camera-equipped computing device and the image may be superimposed on an image of the physical environment 20 captured by the camera.

In the example embodiment shown in FIG. 1, the plurality of holograms 22 includes three holograms 24A, 24B, and 24C. The computing device 10 further includes a processor 14 and non-volatile memory 16. The processor 14 is configured to store a representation of the physical environment 30 in non-volatile memory 16. The processor 14 may be configured to generate the representation of the physical environment 30 based on inputs received from a sensor and input device suite 18 of the computing device 10.

The representation of the physical environment 30 includes a plurality of hologram anchors 32 indicating locations in the physical environment 20 relative to which the holograms of the plurality of holograms 22 are displayed. In the example embodiment shown in FIG. 1, the plurality of hologram anchors 32 includes three hologram anchors 34A, 34B, and 34C, which correspond to the holograms 24A, 24B, and 24C respectively. When the computing device 10 leaves an area in the vicinity of a hologram anchor, the hologram associated with that hologram anchor may be displayed on the display 12 when the computing device 10 returns to that area.

The processor 14 is further configured to store a priority level of each hologram anchor of the plurality of hologram anchors 32 in the non-volatile memory 16. The priority level of a hologram may indicate a level of importance of that hologram relative to other holograms of the plurality of holograms 22. Each priority level is selected from a plurality of priority levels 40 including at least a high priority level 46 and a low priority level 42. In the example embodiment of FIG. 1, the plurality of priority levels 40 also includes a medium priority level 44. In other embodiments, the plurality of priority levels 40 may include a plurality of levels between the low priority level 42 and the high priority level 46, rather than a single medium priority level 44. At least one hologram anchor of the plurality of hologram anchors 32 has the low priority level 42. In the example embodiment of FIG. 1, hologram anchor 34A has the low priority level 42, hologram anchor 34B has the medium priority level 44, and hologram anchor 34C has the high priority level 46.

The processor 14 is further configured to determine that a total size of the plurality of hologram anchors 32 exceeds a predetermined size threshold 52. In the embodiment depicted in FIG. 1, the total size is a total file size 50. However, the total size may alternately be a database size, a number of database records, a number of hologram anchors, or some other quantity. The predetermined size threshold 52 may be determined based on a total capacity of the non-volatile memory 16. For at least one hologram anchor of the plurality of hologram anchors 32 that was assigned the low priority level 42, the processor 14 is further configured to delete that hologram anchor from the representation of the physical environment 30. Data associated with the hologram anchor may also be deleted. In the example embodiment of FIG. 1, the processor 14 is configured to delete the hologram anchor 34A from non-volatile memory. The hologram anchor 34A may be deleted immediately, or alternately may be marked for deletion and deleted later, for example when the processor 14 determines that the total file size 50 of the plurality of hologram anchors 32 exceeds a second predetermined size threshold. Alternately, instead of deleting the hologram anchor 34A, the size or quality of one or more holograms associated with the hologram anchor 34A may be reduced. After the hologram anchor 34A is deleted, the hologram 24A associated with the hologram anchor 34A is not displayed when the computing device 10 is in the vicinity of the location in the physical environment 20 at which the hologram anchor 34A was previously located. It will be appreciated that the non-volatile memory management described herein is management of data stored in a persistent cache in non-volatile memory such as solid state FLASH memory or a hard disk that persists even when power is cut to the device, and is distinct from the management of data stored in volatile memory of random access memory (RAM). In one particular example, the predetermined threshold size is 400 MB and in another it may be 2.5 gigabytes.

Although the deletion is typically made programmatically, in a variation the computing device may include a disambiguation interface that is presented to the user to determine whether or not to delete data. This may be useful in cases where the analysis of priority information programmatically does not produce a clear result what data should be deleted, such as if only high priority data remains, or where a system setting has been set to receive a preference from the indicating whether the system should programmatically cull the data in non-volatile memory. Thus, in this variation, responsive to the determination that the total file size 50 of the plurality of hologram anchors 32 exceeds the predetermined size threshold 52, the processor 14 may be configured to convey an output 54 to the display 12. The output 54 may include an option to delete one or more hologram anchors 56 of the plurality of hologram anchors 32. Responsive to selection of the option to delete the one or more hologram anchors 56, the processor 14 may be configured to delete the one or more hologram anchors from the representation of the physical environment 30.

The processor 14 may be further configured to receive instructions to add an additional hologram anchor 58 to the representation of the physical environment 30. In response to receiving the instructions to add an additional hologram anchor 58, the processor 14 may determine that the total file size 50 of the plurality of hologram anchors 32 plus the additional hologram anchor 58 exceeds the predetermined size threshold 52. Based at least in part on this determination, the processor 14 may be further configured to prevent the additional hologram anchor 58 from being added to the representation of the physical environment 30. Alternately, the processor 14 may be configured to determine that the additional hologram anchor 58 has the high priority level 46. Based at least in part on this determination, for at least one hologram anchor of the plurality of hologram anchors 32 that was assigned the low priority level 42, the processor 14 may be configured to delete data associated with that hologram anchor from the representation of the physical environment 30. The data associated with the hologram anchor with the low priority level 42 may be deleted immediately, or may be flagged for later deletion. For example, the processor 14 may flag the data associated with the hologram anchor by identifying the key frames that have high discardability factor and deleting the associated data from those identified key frames, as discussed below with reference to FIGS. 6A-6C. In the example embodiment of FIG. 1, the processor 14 may identify at least one key frame that has a high discardability factor and includes data associated with hologram anchor 34A. The processor 14 may then delete the data associated with hologram anchor 34A from the at least one key frame.

Figure 2:
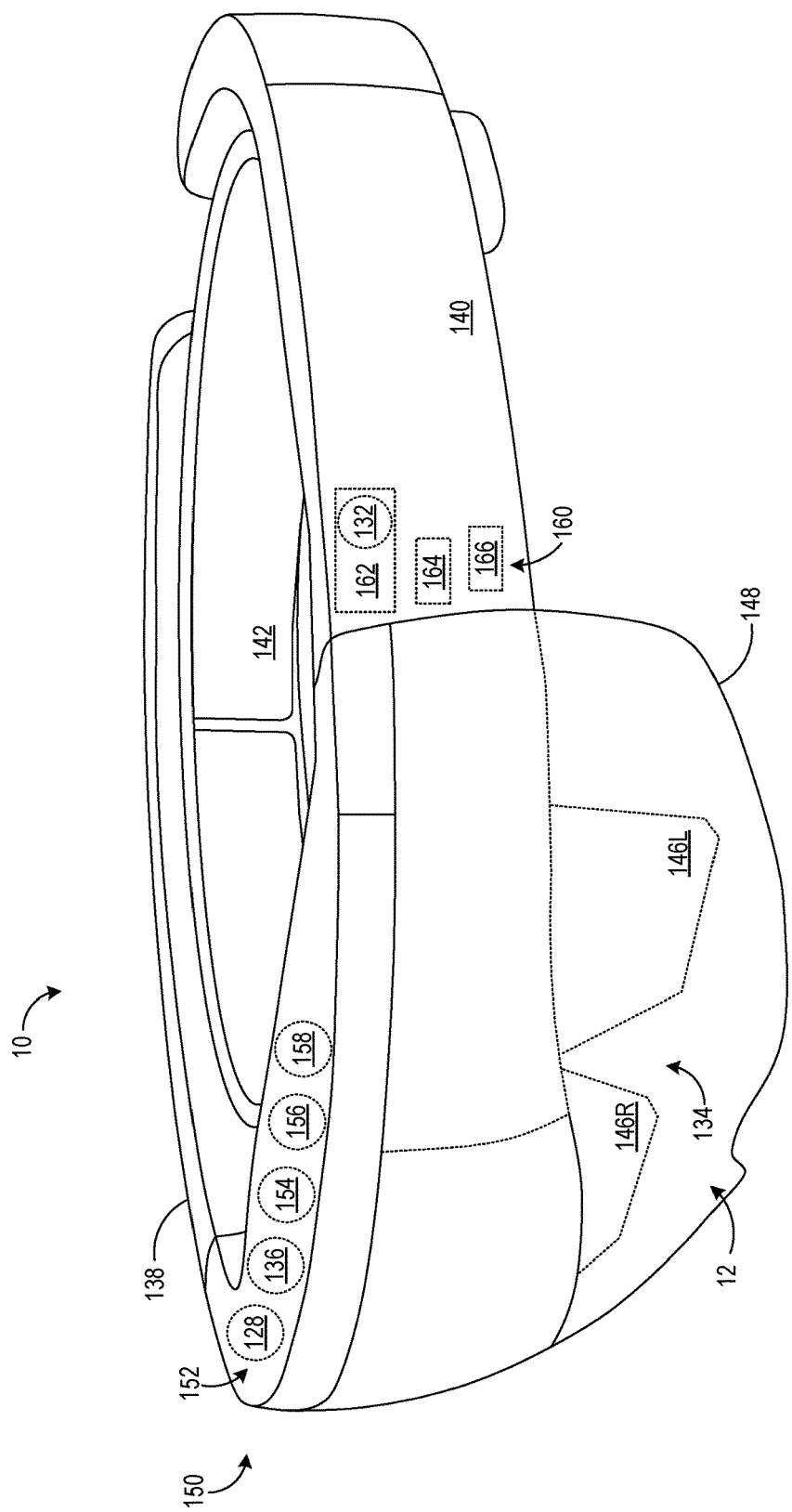
FIG. 2 shows side view of side view of the computing device of FIG. 1, in the form of a head-mounted display device.

FIG. 2 shows a detailed schematic of an example physical embodiment of the computing device 10. In the example physical embodiment of FIG. 2, the computing device 10 is a head-mounted display (HMD) device. The illustrated computing device 10 takes the form of a wearable visor, but it will be appreciated that other forms are possible, such as glasses or goggles, among others. The computing device 10 may include a housing 138 including a band 140 and an inner band 142 to rest on a user's head. The display 12 of the computing device 10 may include the at least partially see-through display 134. The at least partially see-through display 134 may be a stereoscopic display and may include a left panel 146L and a right panel 146R as shown, or alternatively, a single panel of a suitable shape. The panels 146L, 146R are not limited to the shape shown and may be, for example, round, oval, square, or other shapes including lens-shaped. The computing device 10 may also include a shield 148 attached to a front portion 150 of the housing 138 of the computing device 10. The at least partially see-through display 134 and/or the shield 148 may include one or more regions that are transparent, opaque, or semi-transparent. Any of these portions may further be configured to change transparency by suitable means. As such, the computing device 10 may be suited for both augmented reality situations and virtual reality situations.

A controller 160 of the computing device 10 may include a logic subsystem 162, a storage subsystem 164, and a communication subsystem 166. The logic subsystem 162 may include one or more processors 132 configured to execute software instructions. A processor of the one or more processors 132 may be the processor 14 of FIG. 1, and the storage subsystem 164 may include the non-volatile memory 16 of FIG. 1. Logic subsystem 162, storage subsystem 164, and communication subsystem 166 are described in more detail below in regard to FIG. 13.

The processor 132 of the computing device 10 is operatively coupled to the display panels 146R and 146L and to other display-system componentry. The processor 132 includes logic and associated computer memory configured to provide image signals to the display panels 146R and 146L, to receive sensory signals from a sensor system 152, and to enact various control processes described herein. The sensor system 152 may include one or more location sensors 128, one or more optical sensors 136, a gaze detection system 154, one or more microphones 156, as well as one or more speakers 158. The processor 132 may be further configured to provide signals to the sensor system 152.

Figure 3:
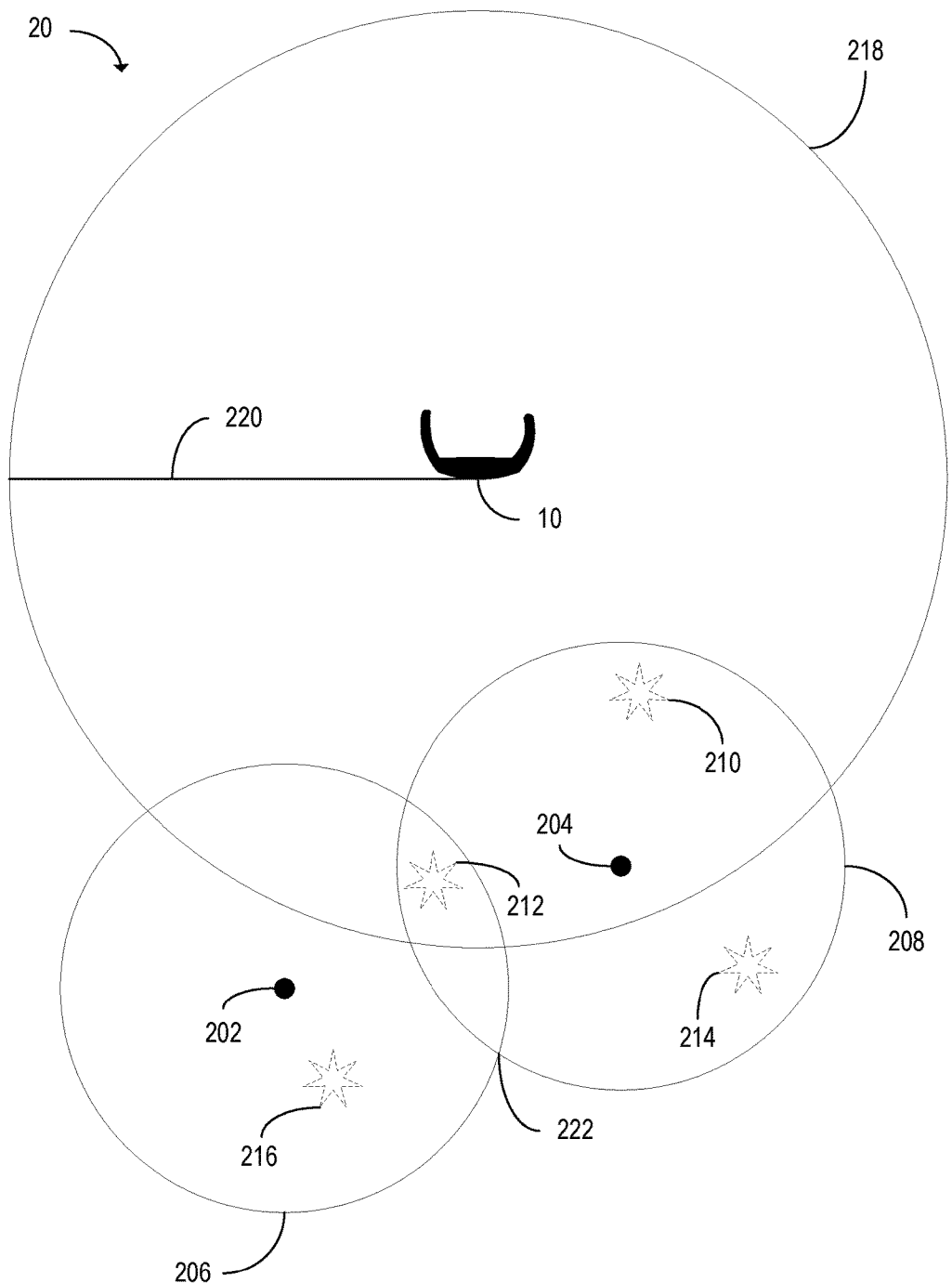
FIG. 3 shows a schematic representation of an example physical environment including a plurality of neighborhoods.

FIG. 3 depicts an example physical environment 20. In the example physical environment 20, hologram anchors 202 and 204 indicate locations of neighborhoods 206 and 208. Within each of the neighborhoods 206 and 208, a plurality of holograms 210, 212, 214, and 216 are displayed in the physical environment 20. FIG. 3 also shows the computing device 10 of claim 1 with an associated device viewing area 218 that extends to a predetermined distance 220 from the computing device 10. The predetermined distance 220 may be a spatial distance, or a distance on a graph as described below with reference to FIG. 6A.

In some embodiments, each hologram may be displayed when the hologram anchor of that hologram is within the device viewing area 218. In FIG. 3, the holograms 210, 212, and 214 would be displayed, since hologram anchor 204 is within the device viewing area 218, and holograms 210, 212, and 214 are within the neighborhood 208 of the hologram anchor 204.

In some embodiments, the processor 14 of the computing device 10 may be configured to determine an area of overlap 222 between the neighborhoods 206 and 208. The processor 14 may be further configured to determine an area of overlap 222 between more than two neighborhoods. In response to the determination of the area of overlap 222, the processor 14 may be configured to lower the priority level of one or more of the hologram anchors 202 and 204 with neighborhoods 206 and 208 that overlap in the area of overlap 222. Lowering the priority of a neighborhood that overlaps with one or more other neighborhoods may be helpful when the neighborhoods include many of the same holograms. In such cases, one or more of the hologram anchors may include redundant data. Thus, in response to the determination of the area of overlap 222, the processor 14 may be configured to de-associate at least one hologram 212 displayed in the area of overlap 222 from one or more of the two or more neighborhoods 206 and 208 and their associated hologram anchors 202 and 204. Redundant location data for the hologram 212 may therefore be deleted.

Figure 4A:
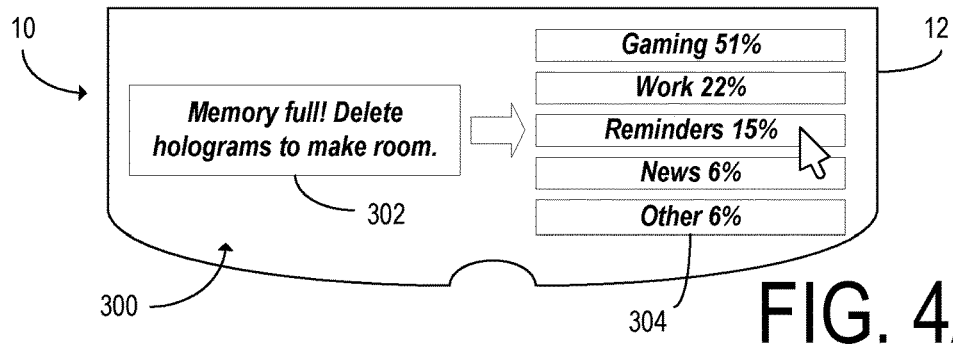
FIGS. 4A-4D show an example display of the example computing device of FIG. 1.

FIGS. 4A-4D depict the display 12 of the example computing device 10 of FIG. 1, on which is displayed an example graphical user interface (GUI) 300. In FIG. 4A, the GUI 300 displays a notification 302 including the text "Memory full! Delete holograms to make room." The GUI 300 also displays a list of hologram categories 304, including for each category a percentage of the total file size 50 taken up by holograms in that category. The hologram categories and their associated percentages are "Gaming 51%," "Work 22%," "Reminders 15%," "News 6%," and "Other 6%." In this example, the user selects "Reminders 15%."

Figure 4B:
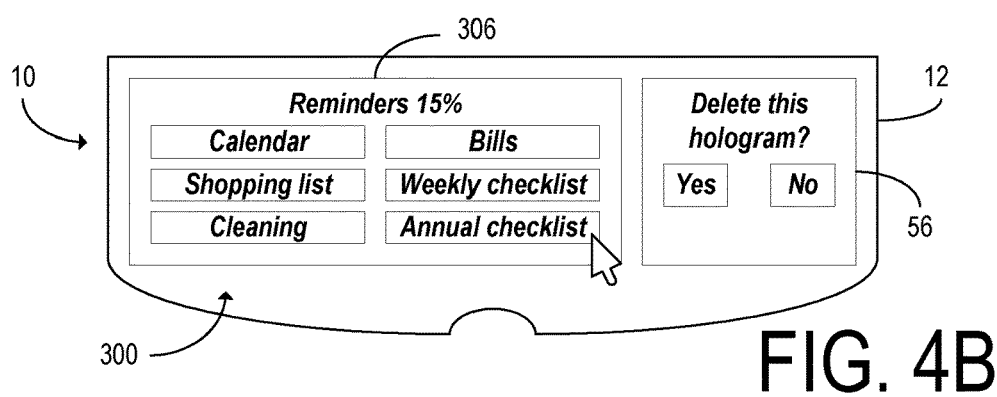

FIG. 4B shows the display 12 after "Reminders 15%" is selected. The GUI 300 displays a list of hologram anchors 306 included in the "Reminders" category. These anchors include "Calendar," "Shopping list," "Cleaning," "Bills," "Weekly checklist," and "Annual checklist." In response to the user selecting "Annual checklist," the GUI 300 displays an option 56 to delete the hologram anchor associated with the "Annual checklist" hologram. In response to the user selecting "Yes," the processor 14 of the computing device 10 may delete the hologram anchor.

Figure 4C:
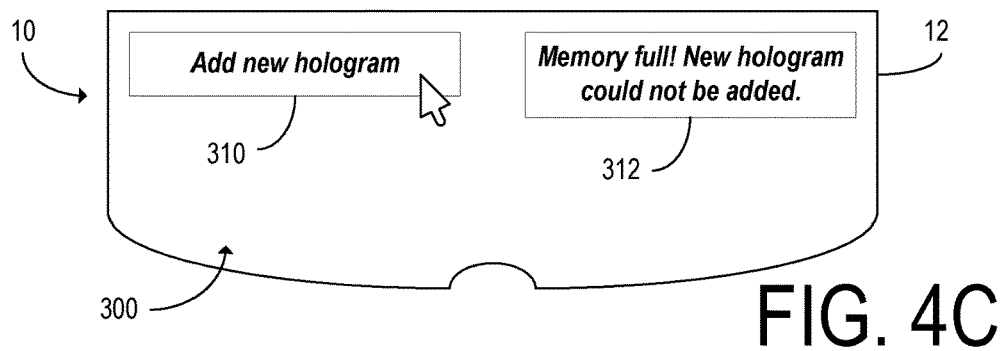
Figure 4D:
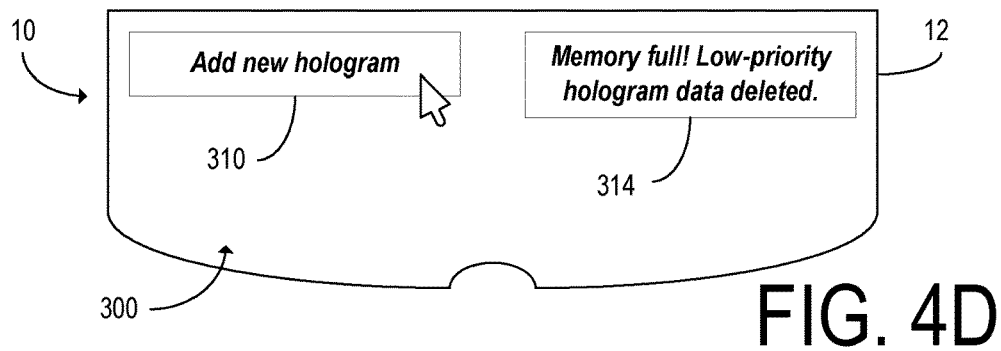

FIGS. 4C and 4D show the display 12 after the user attempts to add an additional hologram anchor 58, but the processor 14 determines that adding the additional hologram anchor 58 would cause the total file size 50 to exceed the predetermined size threshold 52. In FIG. 4C, in response to the user selecting an "Add new hologram" option 310, the GUI 300 displays a notification 312 that includes the text "Memory full! New hologram could not be added." The processor 14 does not add the additional hologram anchor 58 to the plurality of hologram anchors 32. In FIG. 4D, in response to the user selecting the "Add new hologram" option 310, the GUI 300 displays a notification 314 that includes the text "Memory full! Low-priority hologram data deleted." The processor 14 deletes data associated with at least one hologram anchor of the plurality of hologram anchors 32 that was assigned the low priority level 42 from the representation of the physical environment 30.

FIG. 5A depicts an example physical environment 20, including an object 400, in which a user plays an augmented reality video game. The representation of the physical environment 30 may include a plurality of surface hologram anchors 404 that indicate a surface 402 of the object 400 in the physical environment 20. In the example of FIG. 5, the object 400 is a landscape, and the surface 402 is the ground. The plurality of holograms associated with the plurality of surface hologram anchors 404 includes a hologram of a grid 406 and a hologram of a tree 408.

Locations of the surface hologram anchors 404 may be determined based on data received by the sensor and input device suite 18. Surface hologram anchors 404 may be used, for example, when a hologram is displayed as moving along the surface 402 of the object 404. In such cases, using a single neighborhood that includes all locations at which the hologram may appear may be impractical, especially when such a neighborhood would be very large. By using surface hologram anchors 404, the computing device 10 may instead associate the hologram with a different hologram anchor when the position of the hologram changes. The computing device 10 may also use the surface hologram anchors 404 to determine a location of a hologram that is intended to appear on the surface 402 of the object 400, so that, for example, the hologram does not appear to intersect with the surface 402.

FIG. 5B shows another example physical environment 20. The physical environment 20 includes a first room 410 and a second room 412 that are separated by some large distance. Alternately, one room may be occluded from view when in the other room. A first plurality of holograms 414 is associated with a first hologram anchor 416 located in the first room 410, and second plurality of holograms 418 associated with a second hologram anchor 420 is located in the second room 412. Since the first room 410 and the second room 412 are separated by a large distance, the first plurality of holograms 414 is not visible in the second room 412 and the second plurality of holograms 418 is not visible in the first room 410. The first hologram anchor 414 and the second hologram anchor 420 may be surface hologram anchors. A path 422 taken by a user between the first room 410 and the second room 412 is also shown. As the user traverses the path 422, the processor 14 may lower the priority of the first hologram anchor 416.

Figure 6A:
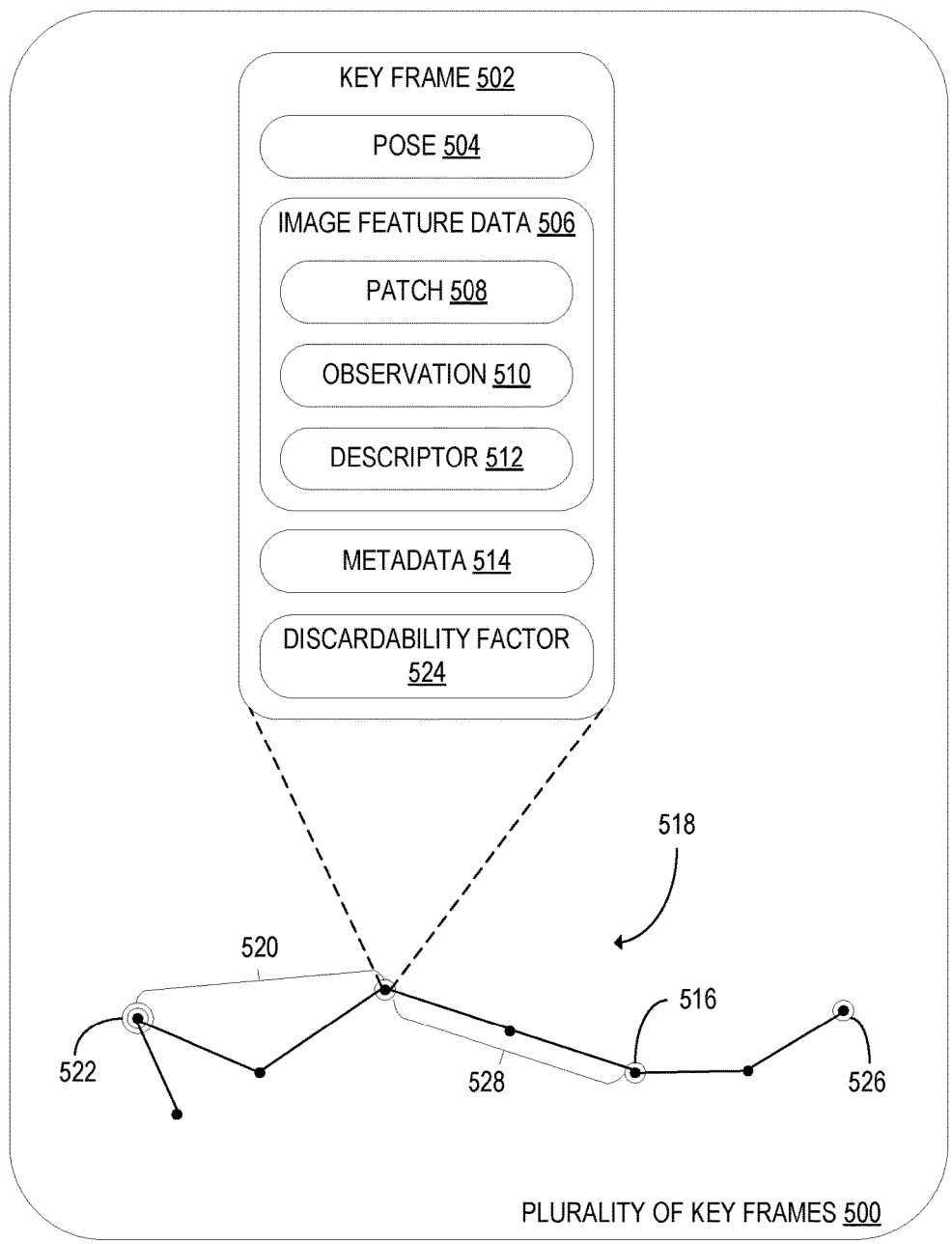
FIG. 6A shows a schematic representation of a plurality of key frames generated by the computing device of FIG. 1.

In some embodiments of the present disclosure, the representation of the physical environment 30 may include a plurality of data objects that may be a plurality of key frames. "Key frame" is defined here as a set of map data associated with a location in the physical environment 20, and may include image feature data obtained from the sensor and input device suite 18. FIG. 6A depicts the plurality of key frames 500, wherein each hologram anchor of the plurality of hologram anchors 32 shown in FIG. 1 is associated with a key frame. Data included in an example key frame 502 is shown. The key frame 502 may include a pose 504, wherein "pose" is defined as a transform representing a rotation and translation change between two key frames in space. The key frame 502 may further include image feature data 506, which may include one or more patch 508, observation 510, and/or descriptor 512. The patch 508 may include an area of an image surrounding a feature, wherein the feature may be used as a location reference point in the physical environment 20. The observation 510 may include a plurality of features, as well as location data for those features. The descriptor 512 may be a compressed version of the patch 508. The key frame 502 may further include metadata 514, which may include characteristics of the computing device 10. The metadata 514 may further include one or more of a time, a gravity vector, a temperature, a magnetic field vector, or other measured data.

As shown in FIG. 6A, the processor 14 may be configured to produce key frames at a predetermined interval in time or space. For example, the processor 14 may be configured to produce a plurality of poses separated by some first predetermined time interval, and produce a key frame 502 including a pose 504 of the plurality of poses at a predetermined spatial interval, such as every two meters. The processor 14 may be further configured to, for each key frame 502, determine at least one spatially adjacent key frame 516 of the plurality of key frames 500. The processor 14 may be further configured to produce a graph 518 including each key frame 502 of the plurality of key frames 500. Each vertex of the graph 518 indicates a pose produced by the computing device 10. Key frames are indicated in the graph 518 by singly circled points. Each key frame 502 in the graph 518 may be connected by a pose graph 528 to the at least one spatially adjacent key frame 516 for that key frame 502. The pose graph 528 may include one or more poses. The graph 518 may be a directed graph, wherein the direction of each edge indicates a direction of travel.

The processor 14 may be configured to determine when one or more hologram anchors are visible to the user based at least in part on the pose 504. Based on this determination, the processor 14 may associate the key frame 502 with the one or more hologram anchors. For each key frame 502 of the graph 518, the processor 14 may be configured to determine a distance 520 on the graph 518 between that key frame 502 and each key frame associated with a hologram anchor that has the high priority value 522. The key frame associated with a hologram anchor that has the high priority value 522 is depicted as a doubly circled point. In the example shown in FIG. 6A, the distance 520 is one. For each key frame 502, the processor 14 may be further configured to determine a discardability factor 524 based at least in part on the distance 520 on the graph 518 between that key frame 502 and each key frame associated with a hologram anchor that has the high priority value 520. The priority level of the hologram anchor associated with each key frame 502 may be determined based at least in part on the discardability factor 524 of that key frame 502. As the discardability factor 524 of a key frame 502 increases, the priority level of the associated hologram anchor may decrease.

Responsive to a determination that the total file size 50 exceeds the predetermined size threshold 52, the processor 14 may be configured to delete the image feature data of the key frame 526 with the highest discardability factor. In the example shown in FIG. 6A, the key frame 526 with the highest discardability factor has a discardability factor of three. By deleting the key frame 526 with highest discardability factor, the processor 14 may bring the total file size 50 below the predetermined size threshold 52 by the deleting image feature data of a key frame 526 that is spatially distant from any key frame associated with a hologram anchor that has the high priority value 522.

Figure 6B:
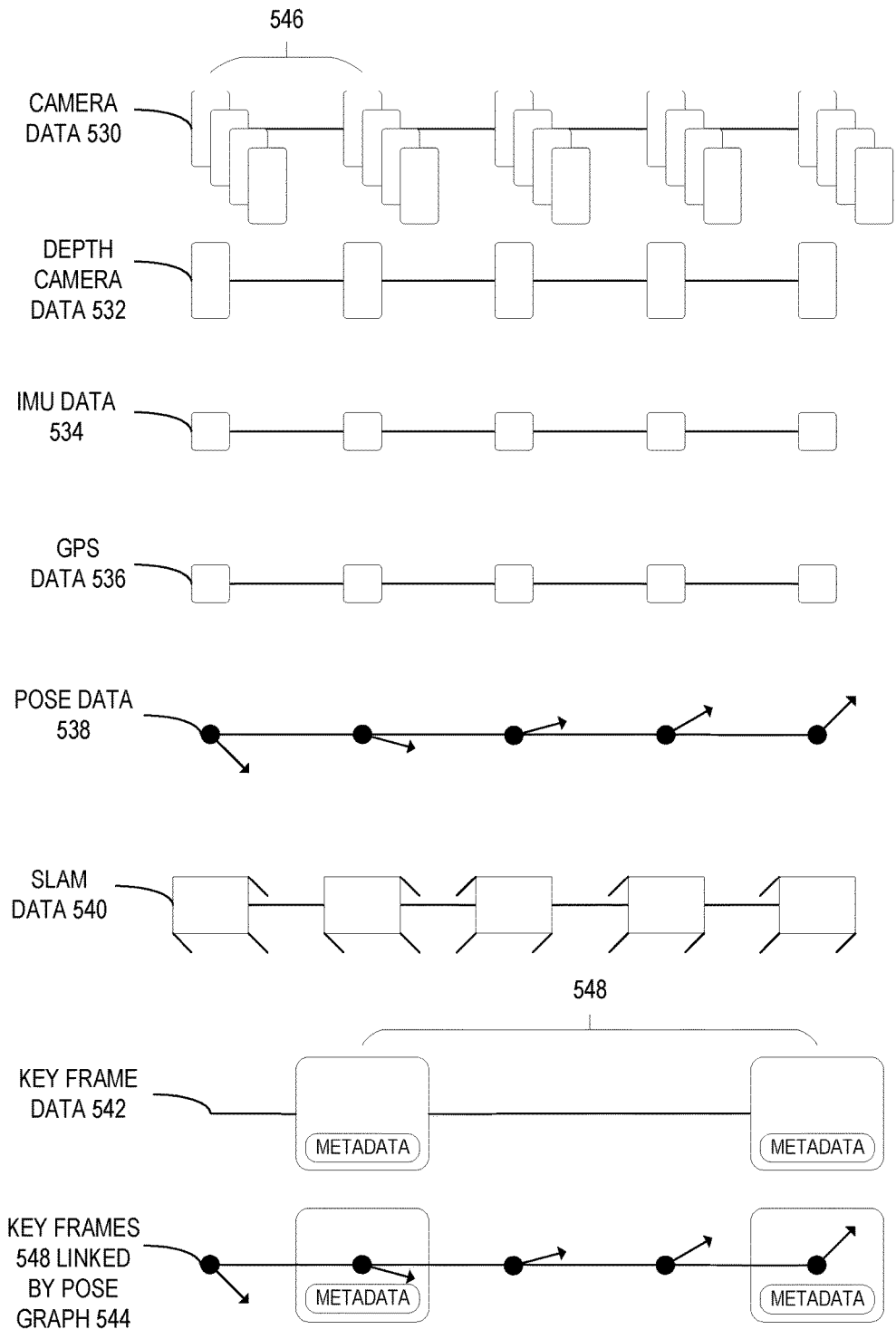
FIG. 6B shows a schematic representation of data collected by the sensor and input device suite and generated by the processor of the computing device of FIG. 1.

FIG. 6B shows an example schematic representation of data collected by the sensor and input device suite 18 and generated by the processor 14 of the computing device 10. The data points in FIG. 6B are shown arranged along a time axis, where later times are shown to the right of earlier times. The data collected by the sensor and input device suite 18 may include camera data 530. In the example of FIG. 6B, the camera data 530 is collected by four cameras at a first predetermined time interval 544. The sensor and input device suite 18 may also collect depth camera data 532 using a depth camera. The sensor and input device suite 18 may use an inertial motion unit (IMU) to collect IMU data 534, and may also use a global positioning system (GPS) receiver to collect GPS data 536. The depth camera data 532, IMU data 534, and GPS data 536 may be collected at the first predetermined time interval 546, or at some other interval.

Based on one or more of the camera data 530, depth camera data 532, IMU data 534, and GPS data 536, the processor 14 may generate pose data 538 including a plurality of poses. The processor 14 may generate the pose data 538 at the first predetermined interval 546, or at some other interval. The processor 14 may also use simultaneous localization and mapping (SLAM) to generate SLAM data 540. The SLAM data 540 may be generated based on the pose data 538, and may include one or more patch, observation, and/or descriptor associated with each pose of the pose data 538.

The processor 14 may generate key frame data 542 based on the pose data 538 and/or the SLAM data 540. Each key frame of the key frame data 542 may be associated with a pose, and may further be associated with one or more patch, observation, and/or descriptor. The key frame data 542 may further include metadata. The key frame data 542 may include a plurality of key frames 500 generated at a second predetermined time interval 548. Alternatively, key frames may be generated at a predetermined spatial interval as the computing device 10 moves through the physical environment 20. Based on at least the pose data 538 and the key frame data 542, the processor 14 may generate a pose graph 544. The pose graph 544 may be the pose graph 518 of FIG. 6A.

FIG. 6C illustrates a general overview of one possible SLAM algorithm for simultaneous location and mapping by computing device 10. According to the SLAM algorithm, a predictive corrective model 550 is typically applied, which may, for example, be a Kalman filter. In each frame (i.e., timestep), a predicted pose 552 in a next frame is computed based on IMU data 534 from an IMU 556 of the computing device 10 by an integration engine 558, and then a correction to the predicted pose 552 is computed by the predictive corrective model (e.g., Kalman filter) 550 based on estimated and observed positions of features in the physical environment 20 sensed by sensors such as cameras 560 and depth camera 562, and finally the predicted pose 552 is updated and an updated pose 564 is fed back to the integration engine 558, for computing the predicted pose 552 at the subsequent time step. Additional sensors such as LIDAR, microphone arrays, etc. may also be used to obtain observations of features in the environment which may be used to compute the correction and updated pose by the predictive corrective model 550.

Feature descriptors 566 that describe features such as edges, corners, and other patterns that are detectable through image processing techniques are prestored in a feature library 568 in non-volatile memory 16. In real time, camera data 530 and depth camera data 532 are respectively captured by cameras 560 and depth camera 562, and processed by a feature matching engine 574 executed by processor 14 to detect whether the prestored features 566 are present in the camera data 530 and depth camera data 532 by looking for regions in the camera data 530 and depth camera data 532 that match the feature descriptors 566. For each detected feature, the location (e.g., coordinate area) and type of the feature are stored as observation data 576 associated with each frame. It will be appreciated that dozens or hundreds of such features 566 may be recognized in an image, and the collection of these observations 576 of features 566 may be referred to informally as a pointcloud of detected features in the image. Further, for each detected feature in the image, a patch 508 from the image is taken surrounding the detected feature and stored in memory for later recall. This patch 508 is typically a two-dimensional array of pixels or voxels from the region of the captured image, and can be used in future localization steps when the computing device 10 captures images of the feature from another angle, by performing perspective correction on the patch to determine whether (and where) the features in the perspective corrected patch are present in the subsequent image. The features 566, observations 576, and patches 508 for each frame are collectively referred to as feature matching data 580. The feature matching data 580 typically does not include the depth camera data 532 or camera data 530. The feature matching data 580 may be stored in non-volatile or volatile memory for certain of the frames, referred to as key frames, as discussed above. Together, the pose graph 518, feature matching data 580, surface reconstruction data, and key frames linked by pose graph 518 may collectively be referred to as map data. As the computing device 10 moves throughout the physical environment 20, it maps the environment and stores its aggregated knowledge of the environment as map data.

Figure 7:
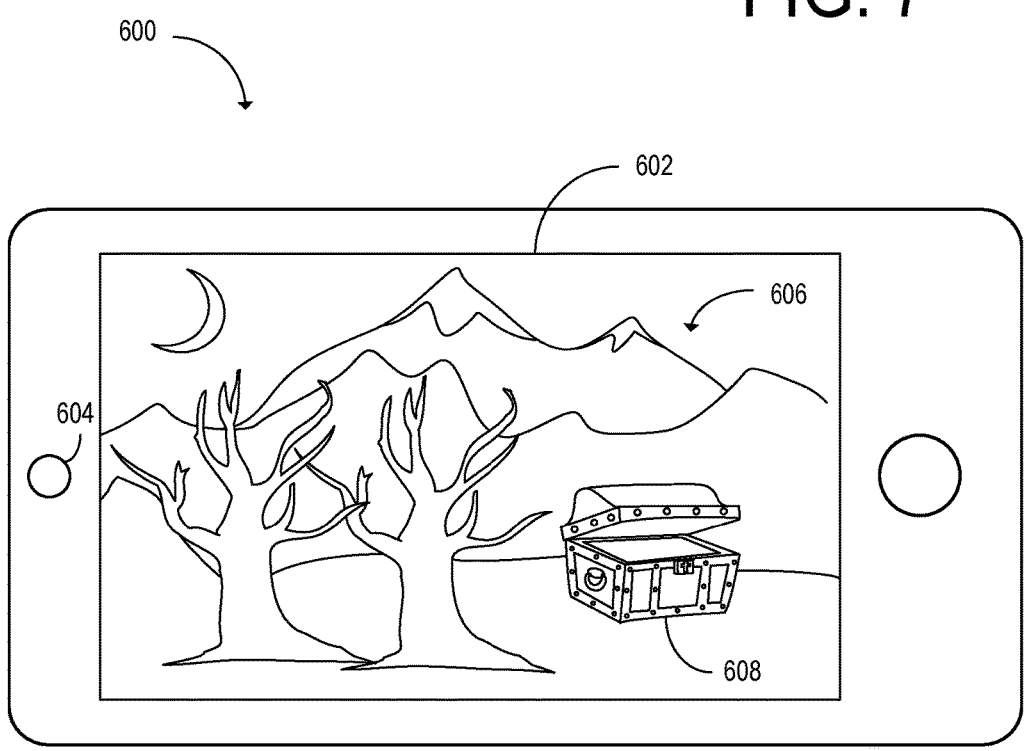
FIG. 7 shows a schematic representation of an example computing device that is a smartphone.

While the above examples are described in the context of displaying holograms, it will be appreciated that the present disclosure may be utilized with other virtual content, such as two-dimensional images, and with non-holographic displays. For example, tablet computers, smartphones, and other mobile computing devices may receive a digital video feed that visually augments a user's view of a physical environment via a display according to the principles of the present disclosure. According to another embodiment of the present disclosure, shown in FIG. 7, the computing device is a mobile phone 600 rather than a head-mounted display device. Instead of a stereo display that is at least partially see-through, the mobile phone 600 of FIG. 7 includes a single display screen 602. The mobile phone 600 further includes a front-facing camera 604, as well as a back-facing camera, not shown. The mobile phone 600 may include a processor configured to show on the display 602 an image of a physical environment 606 captured by the back-facing camera. The processor may be further configured to store a representation of the physical environment 606 in non-volatile memory. The processor may be further configured to display a hologram 608, depicted here as a treasure chest. The hologram 608 is superimposed over the image of the physical environment 606 captured by the back-facing camera.

A location of the hologram 608 in the physical environment 606 may be indicated by a hologram anchor. The hologram 608 may be one of a plurality of holograms, and the hologram anchor associated with hologram 608 may be one of a plurality of hologram anchors. Each hologram anchor of the plurality of hologram anchors may have a priority level, as in the embodiment of FIG. 1, and at least one hologram anchor may have a low priority level. In response to determining that the total file size of the representation of the physical environment exceeds a predetermined size threshold, at least one hologram anchor assigned the low priority level may be deleted.

FIGS. 8-11 show a flowchart of a method 700 for use with a computing device including a display and a processor. At step 702 in FIG. 8, the method may include, at the processor, computing a plurality of holograms for display. At step 704, the method may further include, at the display, displaying at least one hologram of the plurality of holograms superimposed upon a physical environment. The displayed hologram may be determined based at least in part on a location of the computing device in the physical environment.

At step 706, the method may further include, at the processor, storing in non-volatile memory a representation of the physical environment. The representation of the physical environment may include a plurality of hologram anchors indicating locations in the physical environment at which the holograms are displayed. In some embodiments, at least one hologram anchor of the plurality of hologram anchors may indicate a location of a neighborhood in which a plurality of holograms are displayed in the physical environment. In such embodiments, a viewing area may extend to a predetermined distance from the computing device, and each hologram may be displayed when the hologram anchor of that hologram is within the device viewing area.

At step 708, the method may further include storing in non-volatile memory a priority level of each hologram anchor. Each priority level may be selected from a plurality of priority levels including at least a high priority level and a low priority level. At least one hologram anchor of the plurality of hologram anchors may have the low priority level.

At step 710, the method may further include determining that a total size of the plurality of hologram anchors exceeds a predetermined size threshold. At step 712, the method may further include, for at least one hologram anchor of the plurality of hologram anchors that was assigned the low priority level, deleting that hologram anchor from the representation of the physical environment.

Figure 8:
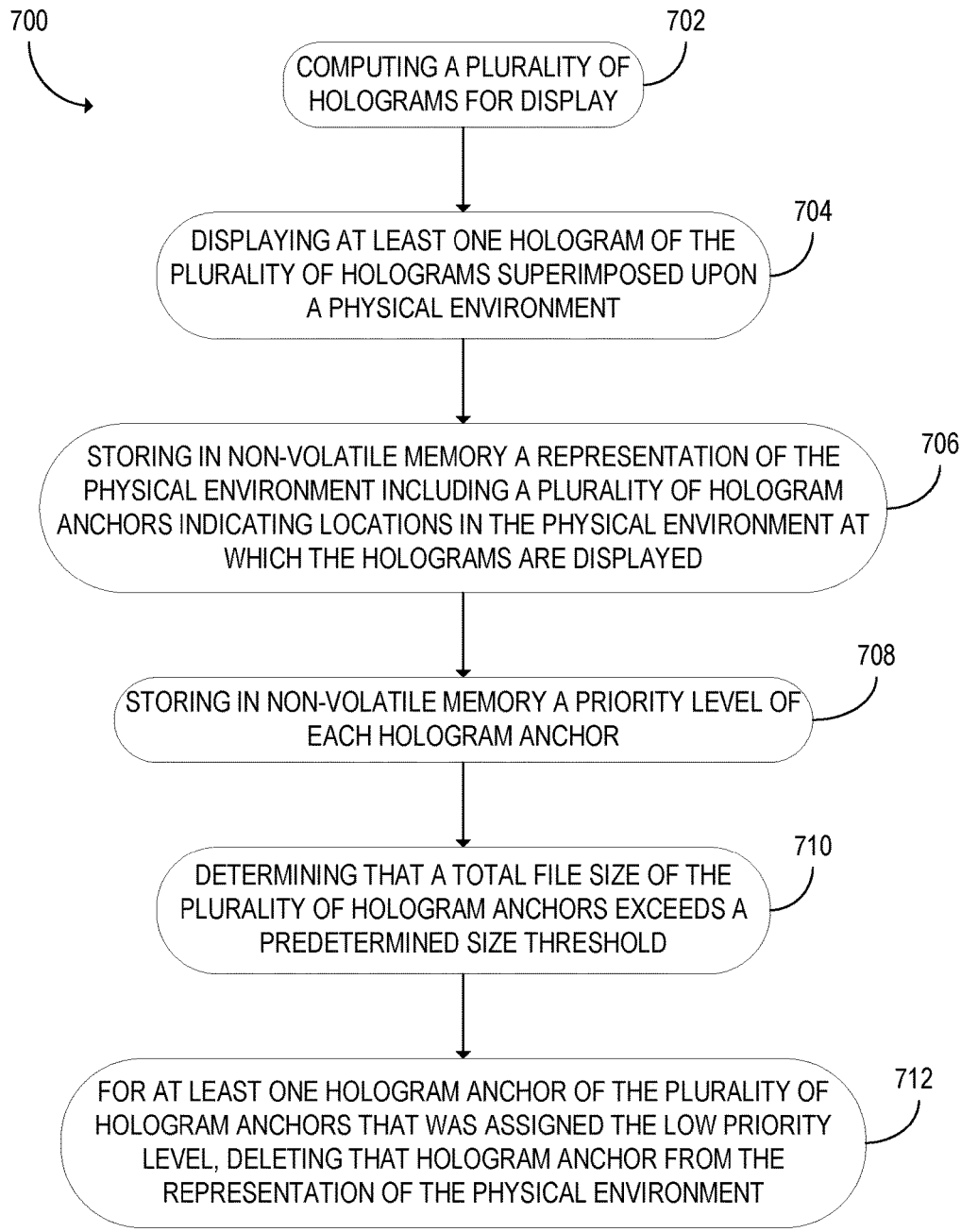
FIG. 8 is a flowchart of a method for use with a computing device including a display and a processor, according to one embodiment of the present disclosure.

FIG. 9 shows steps that may replace step 712 of FIG. 8 as steps performed responsive to the determination that the total size of the plurality of hologram anchors exceeds the predetermined size threshold. At step 714, the method may include conveying to the display an output including an option to delete one or more hologram anchors. At step 716, the method may further include, responsive to selection of the option to delete the one or more hologram anchors, deleting the one or more hologram anchors from the representation of the physical environment.

FIG. 10 shows further steps of the method that may be performed following the steps of FIG. 8. At step 718, the method may include receiving instructions to add an additional hologram anchor to the representation of the physical environment. At step 720, the method may further include determining that the total size of the plurality of hologram anchors plus the additional hologram anchor exceeds the predetermined size threshold. Following step 720, the method may further include one of two steps. At step 722, the method may further include preventing the additional hologram anchor from being added to the representation of the physical environment. Alternately, at step 724, the method may further include determining that the additional hologram anchor has the high priority level. In response to this determination, the method may further include, at step 726, for at least one hologram anchor of the plurality of hologram anchors that was assigned the low priority level, deleting data associated with that hologram anchor from the representation of the physical environment.

Figure 11:
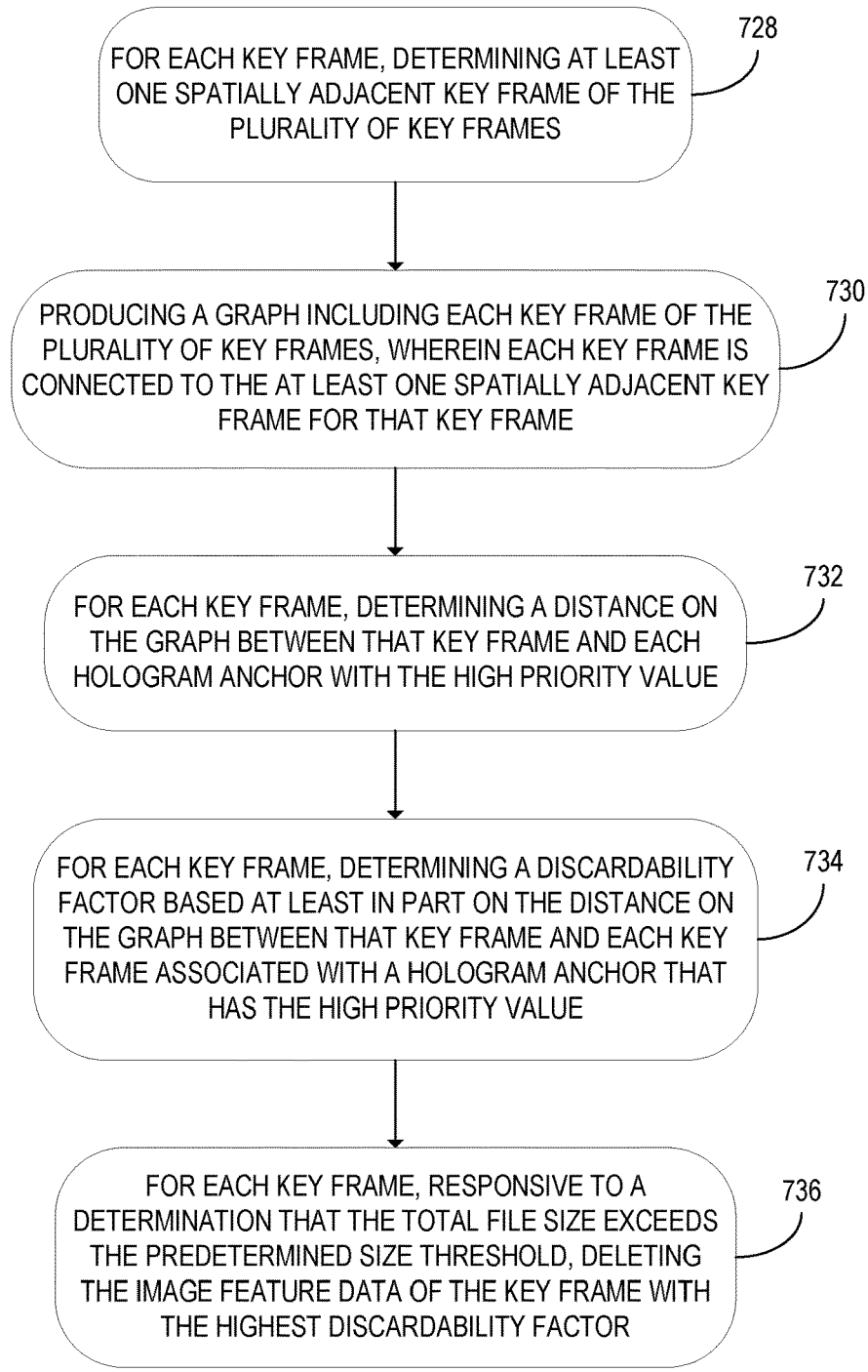
FIG. 11 is a flowchart showing additional steps that may be performed as part of the method of FIG. 8.

In some embodiments, the representation of the physical environment may include a plurality of key frames. Each hologram anchor may be associated with a key frame. Each key frame may include image feature data, and may further include metadata and/or a pose. FIG. 11 shows further steps that may be performed in such embodiments. In such embodiments, the method may include, at step 728, for each key frame, determining at least one spatially adjacent key frame of the plurality of key frames. At step 730, the method may further include producing a graph including each key frame of the plurality of key frames. In the graph, each key frame may be connected by a pose graph to the at least one spatially adjacent key frame for that key frame. Each pose graph may include one or more pose. At step 732, for each key frame, the method may further include determining a distance on the graph between that key frame and each hologram anchor with the high priority value. At step 734, for each key frame, the method may further include determining a discardability factor based at least in part on the distance on the graph between that key frame and each key frame associated with a hologram anchor that has the high priority value. At step 736, the method may further include, for each key frame, responsive to a determination that the total size exceeds the predetermined size threshold, deleting the image feature data of the key frame with the highest discardability factor.

It will be appreciated that method 700 is provided by way of example and is not meant to be limiting. Therefore, it is to be understood that method 700 may include additional and/or alternative steps relative to those illustrated in FIGS. 8-11. Further, it is to be understood that method 700 may be performed in any suitable order. Further still, it is to be understood that one or more steps may be omitted from method 700 without departing from the scope of this disclosure.

Figure 12:
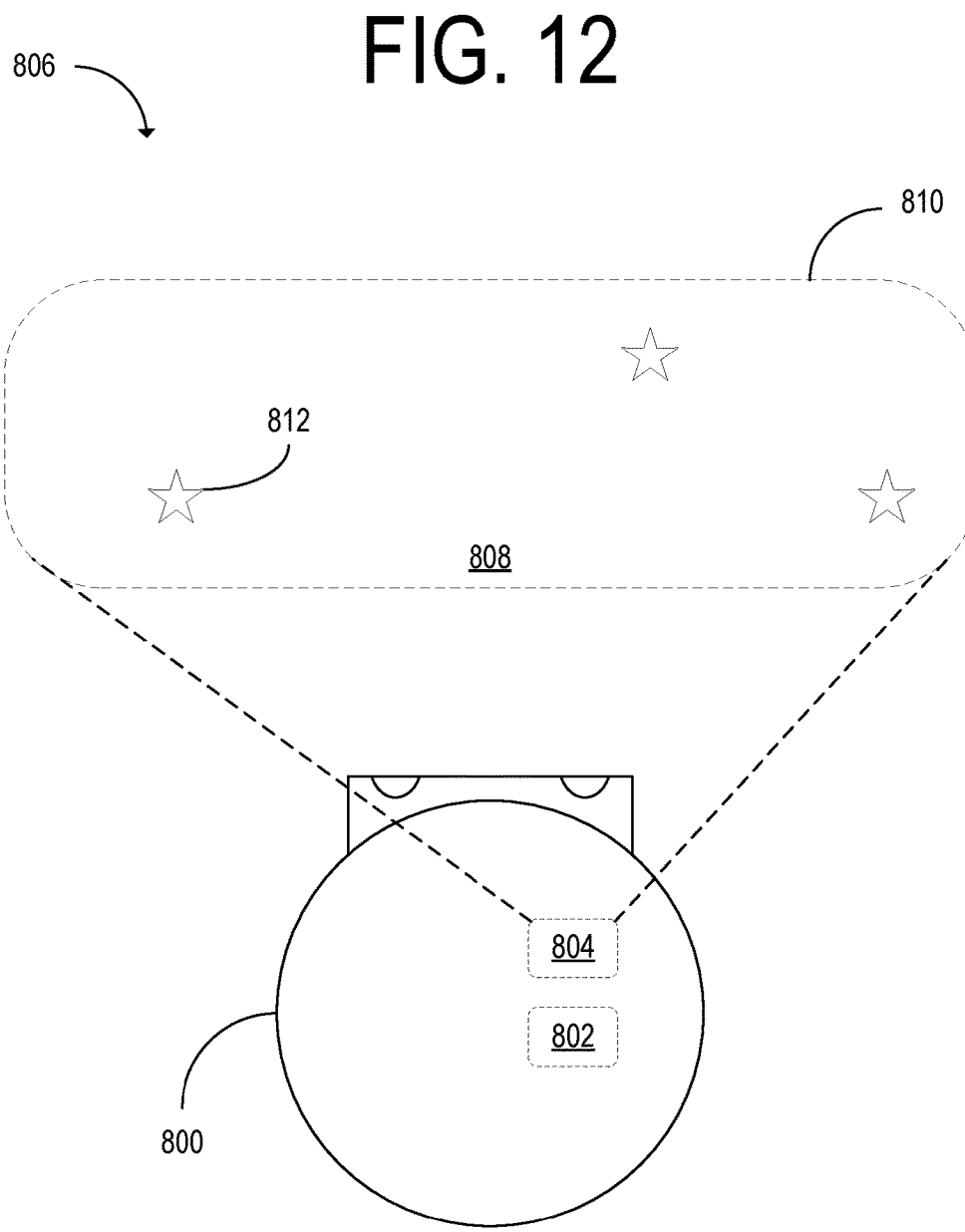
FIG. 12 shows a schematic representation of an example computing device that is a robotic vacuum cleaner, according to one embodiment of the present disclosure.

In some embodiments, location anchors instead of hologram anchors may be used. The location anchors in such embodiments indicate locations in a physical environment, but do not necessarily indicate locations of holograms. FIG. 12 shows a computing device 800, depicted here as a robotic vacuum cleaner. The computing device 800 comprises a processor 802 configured to store in non-volatile memory 804 a representation of a physical environment 806 including a plurality of location anchors 808 indicating locations in the physical environment 806. In the example embodiment of FIG. 12, the computing device 800 may use the location anchors 808 to mark obstacles when navigating a room.

The computing device 800 is further configured to store in the non-volatile memory 804 a priority level of each location anchor of the plurality of location anchors. Each priority level is selected from a plurality of priority levels including at least a high priority level and a low priority level. The plurality of priority levels may further include one or more medium priority levels. At least one location anchor 812 of the plurality of location anchors 808 has the low priority level.

The processor 802 is further configured to determine that a total size of the plurality of location anchors 808 exceeds a predetermined size threshold. The predetermined size threshold may be determined based on a total capacity of the non-volatile memory 804. In response to this determination, for at least one location anchor 812 of the plurality of location anchors 808 that was assigned the low priority level, the processor 802 is further configured to delete that location anchor 812 from the representation of the physical environment 806.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
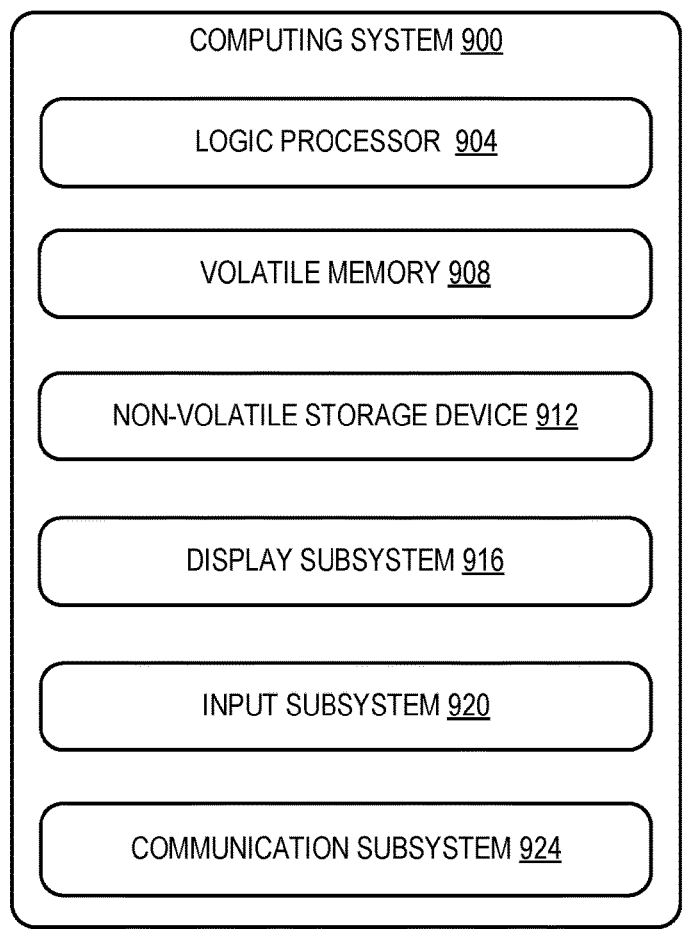
FIG. 13 shows a schematic representation of an example computing system, according to one embodiment of the present disclosure.

FIG. 13 schematically shows a non-limiting embodiment of a computing system 900 that can enact one or more of the methods and processes described above. Computing system 900 is shown in simplified form. Computing system 900 may take the form of one or more display devices as shown in FIG. 2, or one or more devices cooperating with a display device (e.g., personal computers, server computers, tablet computers, home-entertainment computers, network computing devices, gaming devices, mobile computing devices, mobile communication devices (e.g., smartphone), and/or other computing devices). Computing system 900 may alternately take the form of a robot, or one or more devices cooperating with a robot.

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 13.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic processor 904 executing instructions held by non-volatile storage device 912, using portions of volatile memory 908. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices.

When included, input subsystem 920 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 924 may be configured to communicatively couple computing system 900 with one or more other computing devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

According to one aspect of the present disclosure, a computing device is provided, comprising a display configured to display a plurality of holograms superimposed upon a physical environment. The computing device may further comprise a processor configured to store in non-volatile memory a representation of the physical environment including a plurality of hologram anchors indicating locations in the physical environment at which the holograms are displayed. The processor may be further configured to store in non-volatile memory a priority level of each hologram anchor. Each priority level may be selected from a plurality of priority levels including at least a high priority level and a low priority level, and at least one hologram anchor of the plurality of hologram anchors may have the low priority level. The processor may be further configured to determine that a total size of the plurality of hologram anchors exceeds a predetermined size threshold. For at least one hologram anchor of the plurality of hologram anchors that was assigned the low priority level, the processor may be further configured to delete that hologram anchor from the representation of the physical environment.

According to this aspect, at least one hologram anchor of the plurality of hologram anchors may indicate a location of a neighborhood in which a plurality of holograms are displayed in the physical environment. According to this aspect, the processor may be configured to determine an area of overlap between two or more neighborhoods, and, in response to the determination of the area of overlap, de-associate at least one hologram displayed in the area of overlap from one or more of the two or more neighborhoods.

According to this aspect, a device viewing area may extend to a predetermined distance from the computing device, and each hologram may be displayed when the hologram anchor of that hologram is within the device viewing area.

According to this aspect, responsive to the determination that the total size of the plurality of hologram anchors exceeds the predetermined size threshold, the processor may be configured to convey to the display an output including an option to delete one or more hologram anchors. Responsive to selection of the option to delete the one or more hologram anchors, the processor may be configured to delete the one or more hologram anchors from the representation of the physical environment.

According to this aspect, the processor may be further configured to receive instructions to add an additional hologram anchor to the representation of the physical environment. The processor may be further configured to determine that the total size of the plurality of hologram anchors plus the additional hologram anchor exceeds the predetermined size threshold. According to this aspect, the processor may be further configured to prevent the additional hologram anchor from being added to the representation of the physical environment. According to this aspect, the processor may be further configured to determine that the additional hologram anchor has the high priority level, and, for at least one hologram anchor of the plurality of hologram anchors that was assigned the low priority level, delete data associated with that hologram anchor from the representation of the physical environment.

According to this aspect, the representation of the physical environment may include a plurality of surface hologram anchors that indicate a surface of an object in the physical environment, and each surface hologram anchor may have the low priority level.

According to this aspect, the representation of the physical environment may include a plurality of key frames, wherein each hologram anchor is associated with a key frame and each key frame includes image feature data. The processor may be configured to, for each key frame, determine at least one spatially adjacent key frame of the plurality of key frames. The processor may be further configured to produce a graph including each key frame of the plurality of key frames, wherein each key frame is connected by a pose graph to the at least one spatially adjacent key frame for that key frame. For each key frame, the processor may be further configured to determine a distance on the graph between that key frame and each key frame associated with a hologram anchor that has the high priority value.

According to this aspect, the processor may be further configured to, for each key frame, determine a discardability factor based at least in part on the distance on the graph between that key frame and each key frame associated with a hologram anchor that has the high priority value. Responsive to a determination that the total size exceeds the predetermined size threshold, the processor may be further configured to delete the image feature data of the key frame with the highest discardability factor.

According to another aspect of the present disclosure, a method for use with a computing device including a display and a processor is provided, comprising, at the processor, computing a plurality of holograms for display. The method may further include, at the display, displaying at least one hologram of the plurality of holograms superimposed upon a physical environment, The displayed hologram may be determined based at least in part on a location of the computing device in the physical environment. The method may further include, at the processor, storing in non-volatile memory a representation of the physical environment including a plurality of hologram anchors indicating locations in the physical environment at which the holograms are displayed. The method may further include storing in non-volatile memory a priority level of each hologram anchor. Each priority level may be selected from a plurality of priority levels including at least a high priority level and a low priority level, and at least one hologram anchor of the plurality of hologram anchors may have the low priority level. The method may further include determining that a total size of the plurality of hologram anchors exceeds a predetermined size threshold. The method may further include, for at least one hologram anchor of the plurality of hologram anchors that was assigned the low priority level, deleting that hologram anchor from the representation of the physical environment.

According to this aspect, at least one hologram anchor of the plurality of hologram anchors may indicate a location of a neighborhood in which a plurality of holograms are displayed in the physical environment.

According to this aspect, a device viewing area may extend to a predetermined distance from the computing device, and each hologram may be displayed when the hologram anchor of that hologram is within the device viewing area.

According to this aspect, the method may include, responsive to the determination that the total size of the plurality of hologram anchors exceeds the predetermined size threshold, conveying to the display an output including an option to delete one or more hologram anchors. The method may further include, responsive to selection of the option to delete the one or more hologram anchors, deleting the one or more hologram anchors from the representation of the physical environment.

According to this aspect, the method may further include receiving instructions to add an additional hologram anchor to the representation of the physical environment. The method may further include determining that the total size of the plurality of hologram anchors plus the additional hologram anchor exceeds the predetermined size threshold. According to this aspect, the method may include preventing the additional hologram anchor from being added to the representation of the physical environment. According to this aspect, the method may include determining that the additional hologram anchor has the high priority level, and, for at least one hologram anchor of the plurality of hologram anchors that was assigned the low priority level, deleting data associated with that hologram anchor from the representation of the physical environment.

According to another aspect of the present disclosure, a computing device is provided, comprising a processor configured to store in non-volatile memory a representation of a physical environment including a plurality of location anchors indicating locations in the physical environment. The processor may be further configured to store in non-volatile memory a priority level of each location anchor. Each priority level may be selected from a plurality of priority levels including at least a high priority level and a low priority level, and at least one location anchor of the plurality of location anchors may have the low priority level. The processor may be further configured to determine that a total size of the plurality of location anchors exceeds a predetermined size threshold. For at least one location anchor of the plurality of location anchors that was assigned the low priority level, the processor may be configured to delete that location anchor from the representation of the physical environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a display configured to display a plurality of holograms superimposed upon a physical environment;
non-volatile memory storing:
a representation of the physical environment including a plurality of hologram anchors indicating locations in the physical environment at which the holograms are displayed; and
a priority level of each hologram anchor, wherein each priority level is selected from a plurality of priority levels including at least a high priority level and a low priority level, and wherein at least one hologram anchor of the plurality of hologram anchors has the low priority level; and
a processor configured to:
determine that a total file size of the plurality of hologram anchors stored in the non-volatile memory exceeds a predetermined file size threshold; and
for at least one hologram anchor that was assigned the low priority level of the plurality of hologram anchors that exceeds the predetermined file size threshold, delete that hologram anchor from the representation of the physical environment stored in the non-volatile memory.

2. The computing device of claim 1, wherein at least one hologram anchor of the plurality of hologram anchors indicates a location of a neighborhood in which a plurality of holograms are displayed in the physical environment.

3. The computing device of claim 2, wherein the processor is configured to determine an area of overlap between two or more neighborhoods, and, in response to the determination of the area of overlap, de-associate at least one hologram displayed in the area of overlap from one or more of the two or more neighborhoods.

4. The computing device of claim 1, wherein a device viewing area extends to a predetermined distance from the computing device, and wherein each hologram is displayed when the hologram anchor of that hologram is within the device viewing area.

5. The computing device of claim 1, wherein, responsive to the determination that the total size of the plurality of hologram anchors exceeds the predetermined size threshold, the processor is configured to:
convey to the display an output including an option to delete one or more hologram anchors; and
responsive to selection of the option to delete the one or more hologram anchors, delete the one or more hologram anchors from the representation of the physical environment.

6. The computing device of claim 1, wherein the processor is further configured to:
receive instructions to add an additional hologram anchor to the representation of the physical environment; and
determine that the total size of the plurality of hologram anchors plus the additional hologram anchor exceeds the predetermined size threshold.

7. The computing device of claim 6, wherein the processor is further configured to prevent the additional hologram anchor from being added to the representation of the physical environment.

8. The computing device of claim 6, wherein the processor is further configured to:
determine that the additional hologram anchor has the high priority level; and
for at least one hologram anchor of the plurality of hologram anchors that was assigned the low priority level, delete data associated with that hologram anchor from the representation of the physical environment.

9. The computing device of claim 1, wherein:
the representation of the physical environment includes a plurality of surface hologram anchors that indicate a surface of an object in the physical environment; and
each surface hologram anchor has the low priority level.

10. The computing device of claim 1, wherein:
the representation of the physical environment includes a plurality of key frames, wherein each hologram anchor is associated with a key frame and each key frame includes image feature data; and
the processor is configured to:
for each key frame, determine at least one spatially adjacent key frame of the plurality of key frames;
produce a graph including each key frame of the plurality of key frames, wherein each key frame is connected by a pose graph to the at least one spatially adjacent key frame for that key frame; and
for each key frame, determine a distance on the graph between that key frame and each key frame associated with a hologram anchor that has the high priority value.

11. The computing device of claim 10, wherein the processor is configured to, for each key frame:
determine a discardability factor based at least in part on the distance on the graph between that key frame and each key frame associated with a hologram anchor that has the high priority value;
responsive to a determination that the total size exceeds the predetermined size threshold, delete the image feature data of the key frame with the highest discardability factor.

12. A method for use with a computing device including a display and a processor, comprising:
at the processor, computing a plurality of holograms for display;
at the display, displaying at least one hologram of the plurality of holograms superimposed upon a physical environment, wherein the displayed hologram is determined based at least in part on a location of the computing device in the physical environment;
at the processor:
storing in non-volatile memory:
a representation of the physical environment including a plurality of hologram anchors indicating locations in the physical environment at which the holograms are displayed; and
a priority level of each hologram anchor, wherein each priority level is selected from a plurality of priority levels including at least a high priority level and a low priority level, and wherein at least one hologram anchor of the plurality of hologram anchors has the low priority level;
determining that a total file size of the plurality of hologram anchors stored in the non-volatile memory exceeds a predetermined file size threshold; and
for at least one hologram anchor that was assigned the low priority level of the plurality of hologram anchors that exceeds the predetermined file size threshold, deleting that hologram anchor from the representation of the physical environment stored in the non-volatile memory.

13. The method of claim 12, wherein at least one hologram anchor of the plurality of hologram anchors indicates a location of a neighborhood in which a plurality of holograms are displayed in the physical environment.

14. The method of claim 12, wherein a device viewing area extends to a predetermined distance from the computing device, and wherein each hologram is displayed when the hologram anchor of that hologram is within the device viewing area.

15. The method of claim 12, further comprising, responsive to the determination that the total size of the plurality of hologram anchors exceeds the predetermined size threshold:
conveying to the display an output including an option to delete one or more hologram anchors; and
responsive to selection of the option to delete the one or more hologram anchors, deleting the one or more hologram anchors from the representation of the physical environment.

16. The method of claim 12, further comprising:
receiving instructions to add an additional hologram anchor to the representation of the physical environment; and
determining that the total size of the plurality of hologram anchors plus the additional hologram anchor exceeds the predetermined size threshold.

17. The method of claim 16, further comprising preventing the additional hologram anchor from being added to the representation of the physical environment.

18. The method of claim 16, further comprising:
determining that the additional hologram anchor has the high priority level; and
for at least one hologram anchor of the plurality of hologram anchors that was assigned the low priority level, deleting data associated with that hologram anchor from the representation of the physical environment.

19. The method of claim 12, wherein:
the representation of the physical environment includes a plurality of key frames, wherein each hologram anchor is associated with a key frame and each key frame includes image feature data; and
the method further includes:
for each key frame, determining at least one spatially adjacent key frame of the plurality of key frames;
producing a graph including each key frame of the plurality of key frames, wherein each key frame is connected by a pose graph to the at least one spatially adjacent key frame for that key frame; and
for each key frame, determining a distance on the graph between that key frame and each key frame associated with a hologram anchor that has the high priority value.

20. A computing device, comprising:
non-volatile memory storing:
a representation of a physical environment including a plurality of location anchors indicating locations in the physical environment; and
a priority level of each location anchor, wherein each priority level is selected from a plurality of priority levels including at least a high priority level and a low priority level, and wherein at least one location anchor of the plurality of location anchors has the low priority level; and
a processor configured to:
determine that a total file size of the plurality of location anchors stored in the non-volatile memory exceeds a predetermined file size threshold; and
for at least one location anchor that was assigned the low priority level of the plurality of location anchors that exceeds the predetermined file size threshold, delete that location anchor from the representation of the physical environment stored in the non-volatile memory.

* * * * *